United States Patent [19]

Wu

[11] 4,314,881
[45] Feb. 9, 1982

[54] REACTOR CONTROL ROD TIMING SYSTEM

[75] Inventor: Peter T. K. Wu, Clifton Park, N.Y.

[73] Assignee: The United States of America as represented by the United States Department of Energy, Washington, D.C.

[21] Appl. No.: 131,303

[22] Filed: Mar. 18, 1980

[51] Int. Cl.³ .............................................. G21C 17/00
[52] U.S. Cl. .................................... 376/245; 376/258
[58] Field of Search ...................................... 176/19 R

[56] References Cited

U.S. PATENT DOCUMENTS

| | | | |
|---|---|---|---|
| 3,237,150 | 2/1966 | Beck et al. | 176/19 R |
| 3,303,457 | 2/1967 | Akesson | 176/19 R |
| 3,803,365 | 4/1974 | Cartier | 176/19 R |
| 3,913,407 | 10/1975 | Hanff et al. | 176/19 R |
| 4,020,693 | 5/1977 | Ahlgren et al. | 176/19 R |

FOREIGN PATENT DOCUMENTS

| | | | |
|---|---|---|---|
| 2122190 | 11/1972 | Fed. Rep. of Germany | 176/19 R |
| 2252318 | 4/1974 | Fed. Rep. of Germany | 176/19 R |
| 2423782 | 11/1975 | Fed. Rep. of Germany | 176/19 R |
| 51-34397 | 3/1976 | Japan | 176/19 R |
| 54-141993 | 11/1979 | Japan | 176/19 R |
| 348482 | 10/1960 | Switzerland | 176/19 R |

*Primary Examiner*—Sal Cangialosi
*Attorney, Agent, or Firm*—L. E. Carnahan; Roger S. Gaither; Richard G. Besha

[57] ABSTRACT

A fluid driven jet-edge whistle timing system for control rods of a nuclear reactor for producing real-time detection of the timing of each control rod in its scram operation. An important parameter in reactor safety, particularly for liquid metal fast breeder reactors (LMFBR), is the time deviation between the time the control rod is released and the time the rod actually reaches the down position. The whistle has a nearly pure tone signal with center frequency (above 100 kHz) far above the frequency band in which the energy of the background noise is concentrated. Each control rod can be fitted with a whistle with a different frequency so that there is no ambiguity in differentiating the signal from each control rod.

9 Claims, 5 Drawing Figures

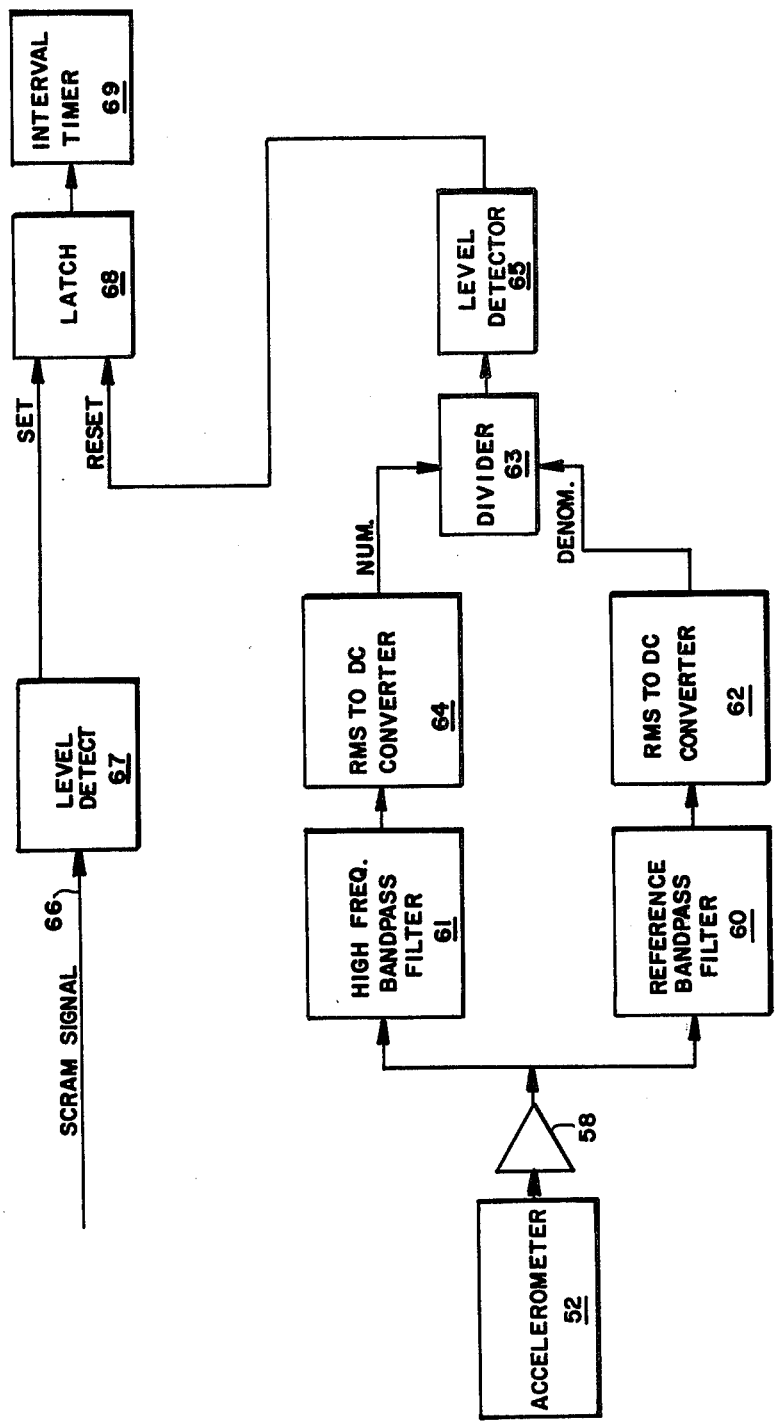

REACTOR CONTROL ROD TIMING SYSTEM

The invention described herein arose in the course of, or under, Contract No. AT(04-3)-893, Task 9, with the United States Department of Energy.

BACKGROUND OF THE INVENTION

The invention relates to a reactor control rod system, particularly to a system for determining the time required for the control rods to move into their scram position, and more particularly to a fluid driven jet-edge whistle timing system for real-time detection of control rod movement.

The basic design of a reactor control rod system is such that the control rods are held by latches, or other means, in an up (out of core) position during normal reactor operation. The scram signal will trigger the latch opening mechanism and the rods will fall along the guide tube downward (into the core) under gravitational and hydraulic forces. The rods have to reach the bottom position (fully inserted into core) within a certain time in order to shut the reactor down safely. The real-time assessment of the timing of the control rods is an essential indication of whether the scram mission is completed or not. This timing is an important parameter in reactor safety, particularly in liquid metal fast breeder reactor (LMFBR) safety.

Various signal producing systems have been developed for monitoring nuclear reactors. For example, U.S. Pat. No. 4,020,693, issued May 3, 1977 in the name of F. F. Ahlgren et al. teaches a modified Galton whistle for nuclear reactor monitoring of the reactor temperature, etc. U.S. Pat. No. 3,237,150, issued Feb. 22, 1966 in the name of K. H. Beck et al., teaches an ultrasonic position indicator system for determining the position of control rods within the core of a nuclear reactor. U.S. Pat. No. 3,913,407, issued Oct. 21, 1975 in the name of M. Hanff et al. teaches an acoustic detection device for use in a nuclear reactor to sense the start of a boiling process in the reactor coolant liquid. U.S. Pat. No. 3,303,457, issued Feb. 7, 1967 in the name of J. A. Akesson, teaches a nuclear reactor control rod position indicator using a permanent magnet which activates an ultrasonic transmitter-receiver when the control rod drops. U.S. Pat. No. 4,064,451, issued Dec. 20, 1977 in the name of M. K. Foxworthy, teaches a control rod position indicator operating in a manner quite similar to the position indicator of above-referenced U.S. Pat. No. 3,303,457.

In addition to the above-referenced exemplary signal producing systems for nuclear reactors, other signal producing devices have been developed, such as exemplified by U.S. Pat. No. 2,971,491 issued Feb. 14, 1961 in the name of H. L. Yeagley which teaches a signal whistle system which emits supersonic vibrations and which can be readily adjustable in pitch; while U.S. Pat. No. 3,053,220 issued Sept. 11, 1962 in the name of H. E. Sawyer teaches an impact energized sound source. Ultrasonic jet-edge whistles are known in the art in various articles, as evidenced for example by J. Hartmann (1939) J. Sci. Instru. 16, p. 140; and by J. V. Bouyoucos et al. (1954), J. Acoust. Soc. Am. Vol. 26, No. 4, p. 511. The jet-edge whistle has been used by industry for emulsification and dispersion, high power sirens, ultrasonic drying, etc. Acoustic signal transmitting and processing systems are known in the art as exemplified by U.S. Pat. Nos. 3,548,648 issued Dec. 22, 1970 in the name of B. Weichbrodt et al., and 4,143,552 issued Mar. 13, 1979 in the name of D. E. Godfrey.

Due to the high temperature of the liquid metal (sodium) environment of the LMFBR core, no electronic device can be used in the core area to detect the timing. An ultrasonic or acoustic impact signal due to the bottoming of the control rod, which may be produced by the above-referenced prior art nuclear monitoring systems provide an indicator of the timing, with the acoustic signal being detected by sensors located on the top portion of the reactor where the environment is such that the sensor could survive. However, there are two difficulties associated with this approach. Firstly, impact (acoustic) signals have a rather broad band spectrum. The central frequency depends on the configuration of the two impacting bodies. In general, such a signal is in the lower frequency range, usually below 50 kHz. Whether one can detect this kind of broad band signal in the midst of the reactor background noise is very much in question. Secondly, when the reactor scrams, all the control rods will go down simultaneously. There will be many impacts within a very short time. To differentiate which impact signal is created by which control rod requires the development of a sophisticated spatial filtering processing technique. This would involve sizable computer facilities and a lengthy processing time. Thus, a need exists, particularly for an LMFBR, to provide an economical real-time timing measurement system for the control rods, either for the primary or the secondary control rod system.

Therefore, it is an object of this invention to provide an economical real-time timing measurement system for control rods in a nuclear reactor.

A further object of the invention is to provide a control rod timing system particularly adapted for liquid metal fast breeder reactors for measuring the time duration of each control rod during a reactor scram.

Another object of the invention is to provide a timing system for the secondary control rod system of an LMFBR which utilizes a high-frequency (above 100 kHz) pure tone acoustic signal.

Another object of the invention is to provide a fluid driven jet-edge whistle for providing real-time timing measurements for reactor control rods during a scram operation.

Another object of the invention is to provide a real-time timing measurement system which incorporates a fluid driven jet-edge whistle, a signal receiving system, and a signal interpretation circuit system.

Another object of the invention is to provide a fluid driven jet-edge whistle which functions to convert the kinetic and potential energy of the plunging reactor control rod into the kinetic energy of the jet thereby producing signals for real-time detection of the timing of the control rod in its scram operation.

Other objects of the invention will become readily apparent from the following description and accompanying drawings.

SUMMARY OF THE INVENTION

The present invention fills the above-mentioned need by providing a system capable of realtime detection of the timing of each control rod of a reactor in its scram operation. The timing system of this invention determines the duration between the time a control rod is released and the time the rod actually reaches its down (in core) position. The timing system consists of a jet-edge whistle, signal receiving system, and signal interpretation circuit system. The jet-edge whistle has an energy conversion portion, a jet nozzle, an annular edge portion, and a resonator cavity portion, for converting impact energy into a high-frequency (above 100 kHz) pure tone acoustic signal, which is far above the frequency band of the reactor background noise. Each control rod can be fitted with a whistle with a different frequency to provide for differentiating the signals from each control rod.

BRIEF DESCRIPTION OF THE DRAWINGS

FIG. 5 is a block diagram of the scram timer for the FIG. 1 embodiment.

DETAILED DESCRIPTION OF THE INVENTION

The present invention provides an economical real-time timing measurement system for reactor control rods, particularly for control rods, both primary and secondary rods, in an LMFBR. The invention utilizes a fluid driven jet-edge whistle as the timing signal source. The whistle is installed on a control rod and is actuated by the plunging force of the rod when it reaches the bottom position. The whistle has a nearly pure tone signal with center frequency (above 100 kHz) far above the frequency band in which the energy of the background noise is concentrated. Each control rod can be fitted with a whistle having a different frequency. Therefore, there is no ambiguity in differentiating the signals from each control rod. The high frequency whistle signals travel along the tubular structure of the control rod and are sensed by an accelerometer mounted on the upper portion of each control rod drive mechanism. An electrical lead from the accelerometer to an amplifier located externally of the control rod can join other electrical lines in the coil cord to the outside of the reactor where the signals are interpreted by an interpretation circuit system.

The jet-edge timing system of this invention basically consists of the following three subsystems:
(1) The jet-edge whistle:
 (a) energy conversion section
 (b) jet nozzle section
 (c) annular edge section
 (d) resonator cavity section
(2) Signal receiving system
(3) Signal interpretation circuit system.
Each of these three subsystems will be described in detail hereinafter.

Figure 1:
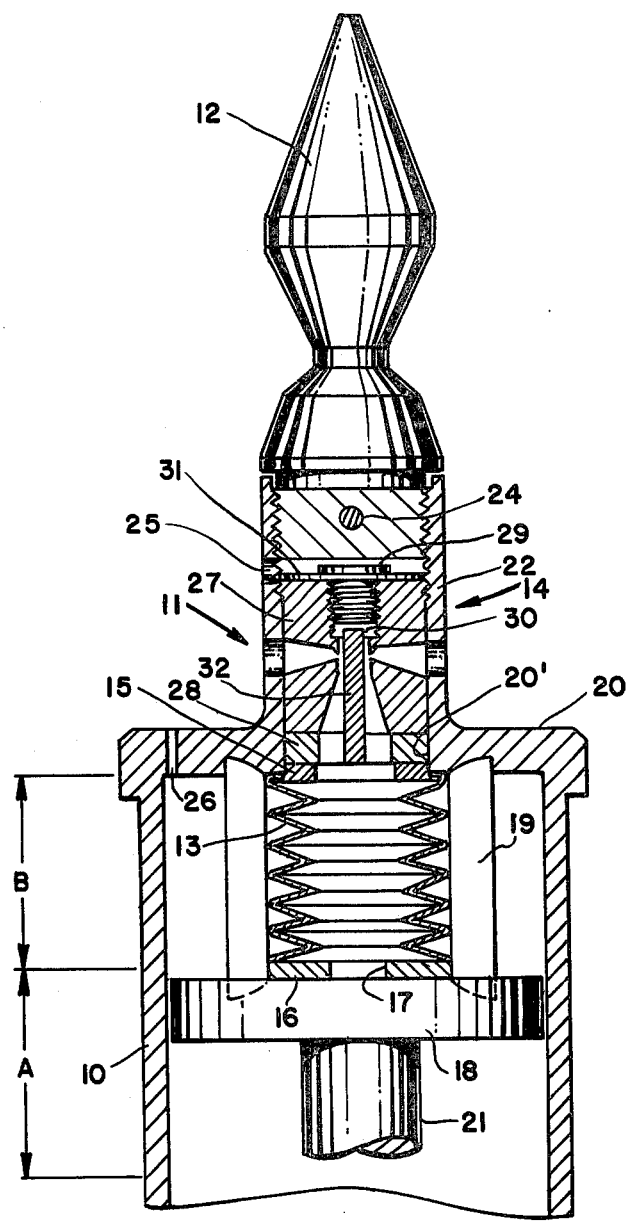
FIG. 1 illustrates an embodiment of a jet-edge whistle for a reactor control rod in accordance with the invnetion.
Figure 3:
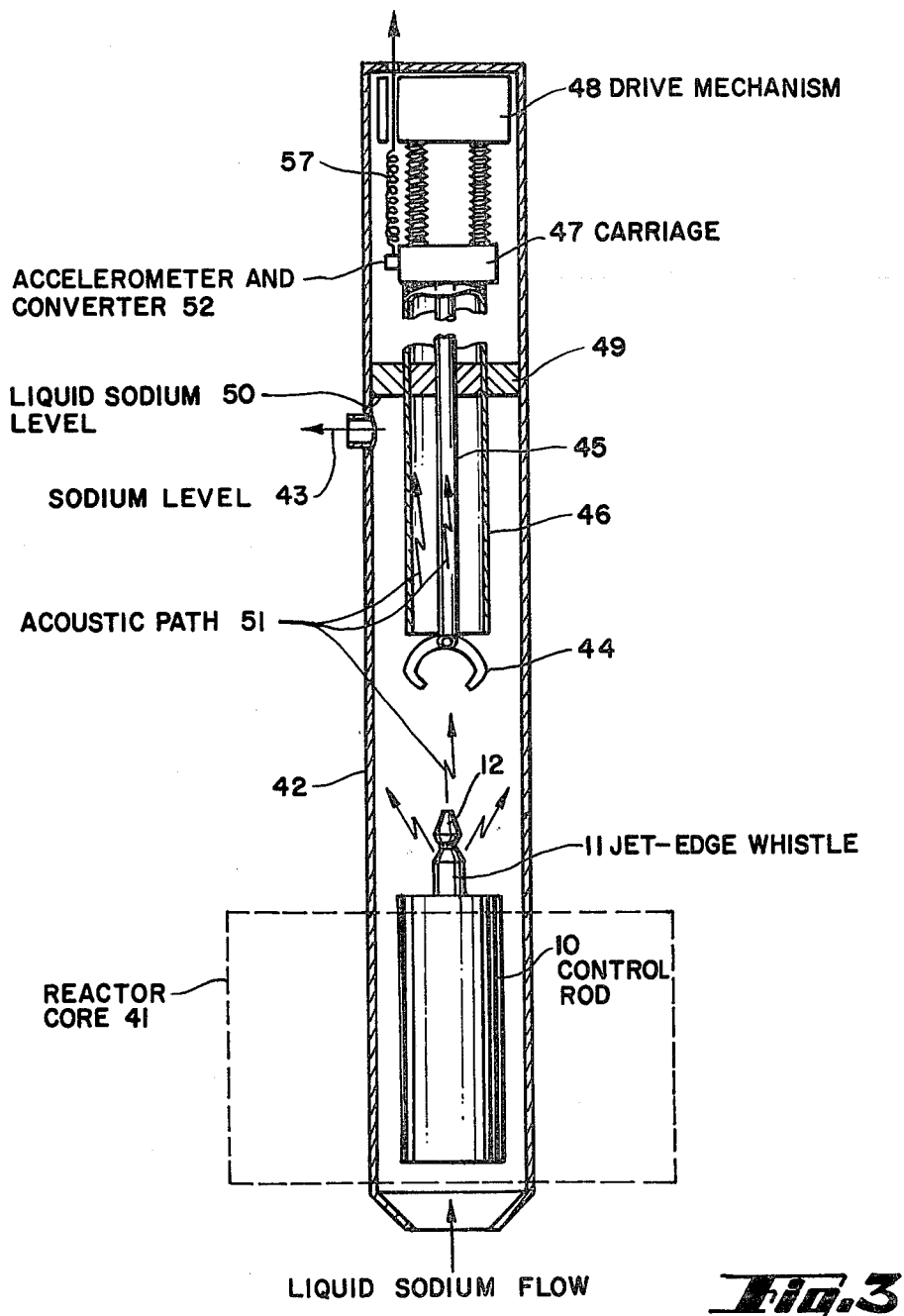
FIG. 3 diagramatically illutrates the location of the components of a reactor control system incorporating the invention.

FIG. 1 illustrates the basic structure of the jet-edge whistle located in the straight rod section below the coupling head of a control rod. The FIG. 1 embodiment consists basically of contol rod 10 having the jet-edge whistle, indicated generally at 11, located in the upper section thereof, and terminating in a coupling head 12 which, as seen in FIG. 3, is adapted to be retained in a latch mechanism.

Figure 2:
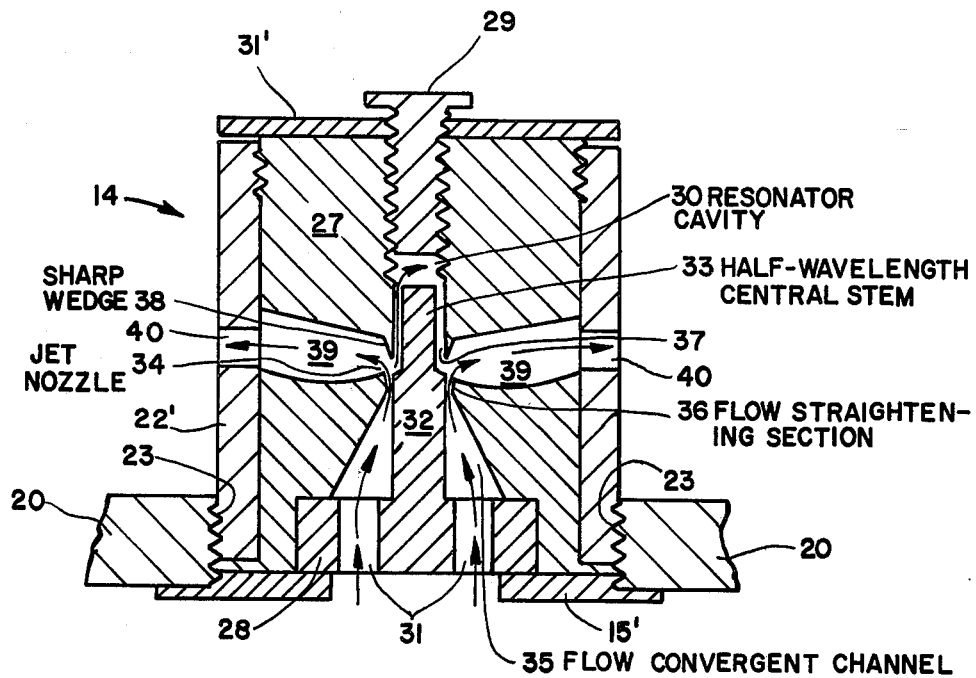
FIG. 2 is an enlarged view of a modified embodiment of the jet-edge resonator section of the FIG. 1 whistle.

The jet-edge whistle 11, as illustrated in FIGS. 1 and 2, consits of an energy conversion section comprising a bellows 3 and jet nozzle-annular edge-resonator cavity section 14. The bellows 13 generates a pressure pulse, when the control rod 10 hits bottom in the reactor core upon activation of the rod release mechanism or latch, which activates section 14. One end of bellows 13 is secured to an apertured plate 15 with the other end of the bellows secured to an end plate 16 having an aperture 17 therein. The end plate 16 has a smooth flat lower surface so that it can mate with an adjoining surface of an arresting arm 18 to create a proper fluid seal therebetween. A plurality of bellows guide rods 19 surround bellows 13 and extend from arresting arm 18 to a top plate 20 of control rod 10. Apertured plate 15 is threadedly secured in an aperture 20' of top plate 20. A damper shaft 21 is secured to the lower side of arresting arm 18 and extend to the lower end of control rod 10 to a damping mechanism, as known in the art. The top plate 20 includes an upwardly extending sleeve, casing, or collar 22 within which whistle section 14 of whistle 11 is located. Note that in the FIG. 2 embodiment, top plate 20 is threadedly interconnected in aperture 20' with a sleeve, casing, or collar 22' as indicated at 23. The upper portion of sleeve or casing 22 is internally threaded to support therein components of whistle section 14 and to which is threadedly connected coupling head 12 with a locking pin 24 extending therethrough. A whistle flow exit hole or port 25 extends through sleeve 22 adjacent the upper end of whistle section 14. Top plate 20 is also provided with a vent hole 26. As shown in FIG. 1, the bellows 13 has a stroke, indicated at A, of 1.75 inch, for example, and a compressed length, indicated at B, of 1.625 inch.

The whistle resonator section 14, as seen in FIGS. 1 and 2, comprises a body member generally indicated at 27 and central stem forming member generally indicated at 28, with body member 27 being threadedly connected at the upper end to sleeve 22 (sleeve 22' in FIG. 2) and both members being retained in sleeve 22 or 22' by apertured plate 15 or 15', respectively threadedly secured in aperture 20' of top plate 20, a threaded adjustment member 29 extends into a central opening in body member 27 to define an adjustable resonator cavity 30, member 29 being threaded through an upper plate 31 (31' in FIG. 2) which is secured in sleeve 22 as shown in FIG. 1 adjacent whistle flow exit hole 25. Member 28 is provided with a plurality of openings 31, which provide for fluid passage from control element 10 into the cavity 30, and an upwardly protruding portion 32 having a reduced diameter end section which forms a half-wavelength central stem 33. As seen more clearly in FIG. 2, body member 27 is configured to define jet nozzle 34 formed by a flow convergent channel section 35, tapering at an angle of 60° for example, which terminates into a flow straightening section 36, having a length of 0.032 inch for example. Central stem 33 extends into resonator cavity 30 to define thereabout an annular ring shaped orifice 37 with a 0.004 inch gap, for example; stem 33 being of a length equal to the half-wavelength of the center frequency of the whistle operating range. The frequency of the whistle tone can be controlled to vary within a range of approximately 10 kHz by changing the length of the resonator cavity 30 by moving adjusting member 29. Adjacent central stem 33, body member 27 is also provided with a sharp wedge section 38 and a plurality of radially extending configured openings 39 which are in alignment with openings 40 in sleeve 22'.

A pressure pulse of fluid, produced by compression of bellows 13, forces fluid upwardly through openings 31, jet nozzle 34, and outwardly through configured openings 39 producing a whistle tone or acoustic signal established by half-wavelength central stem 33 and resonator cavity 30, which signal is curved upwardly as described hereinafter to a signal receiving system and a signal interpretation circuit system as described with respect to FIGS. 3-5.

Figure 4:
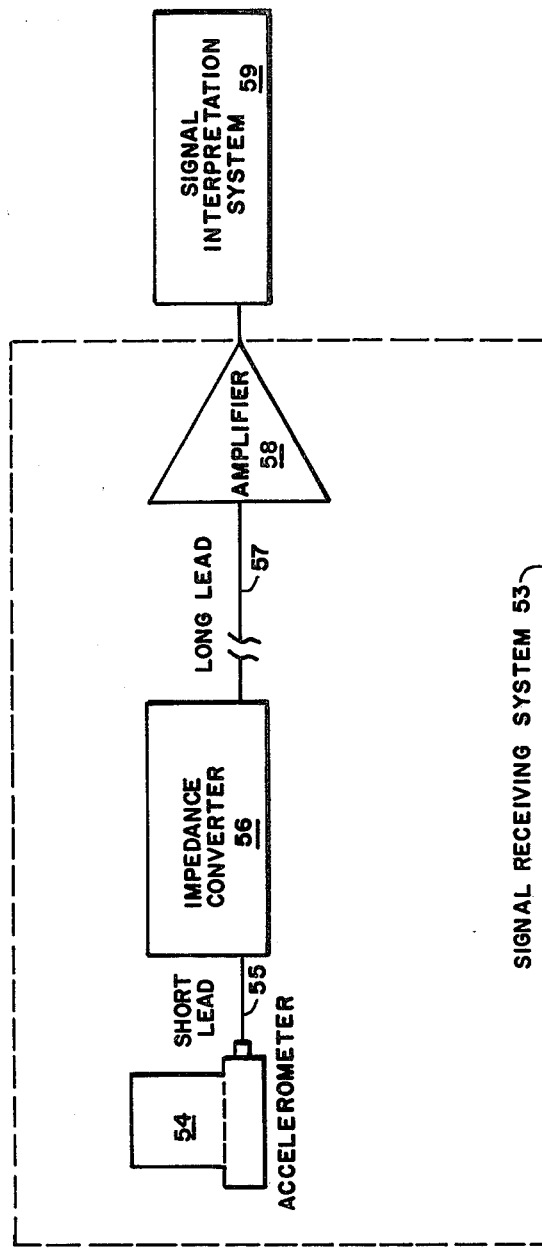
FIG. 4 is a block diagram of the signal receiving system of the whisle system.

Referring to FIGS. 3 and 4, acoustic signals are generated by the jet-edge whistle 11 located between coupling head 12 and control rod 10 in a reactor core 41. Control rod 10 is positioned within a casing or tube 42 through which coolant, such as liquid sodium, flows upwardly as indicated by arrow and legend and exhausts through an exit 43 in casing 42. The control rod 10 is illustrated in the scram position but under normal reactor operation coupling head 12 would be retained in a latch mechanism 44 such that rod 10 is external of core 41. Latch mechanism 44 is operatively attached through a tensor rod 45, located within a guide tube 46, to a carriage assembly 47 of a drive mechanism 48. Inasmuch as control rod latch mechanism and drive systems therefor are known in the art, and since such does not constitute part of the present invention, further description thereof is deemed unnecessary. Carriage assembly 47 and drive mechanism 48 are isolated from the latch mechanism 44 and coolant by a thermo and radiaton shield 49 located adjacent the liquid coolant (sodium) level 50, and thus protected from the high temperature and radiation produced in the reactor core 41. Guide tube 46 and tensor rod 45 are sealable movable through shield 49 such that latch mechanism 44 can be lowered to grasp coupling head 12 to remove control rod 10 from core 41, as known in the art.

As shown in FIG. 3, signals generated by the jet-edge whistle 11 propogate upward forming acoustic paths, as indicated by arrows at 51, through liquid sodium from the top of the contol rod 10 to the area of latch mechanism 44 and from the latch area through tubular structures like the guide tube 46 and tension rod 45 to the carriage assembly 47 of drive mechanism 48. These tubular structures (components 45 and 46) serve as a wave guide for the whistle signals. An accelerometer and impedance converter assembly 52 is secured to carriage assembly 47 above thermo and radiation shield 49 so as to have a solid mechanical tie to the guide tube or tension rod, such that the signal attenuation through interface of different structures can be minimized.

As illustrated in FIG. 4, the signal receiving system generally indicated at 53 incorporates assembly 52 of FIG. 3 composed of a high frequency, high temperature accelerometer 54 connected by a short lead 55 to an impedance converter 56 which in turn is connected via a long lead or line 57 to an amplifier 58, the output of which is connected to the signal interpretation system generally indicated at 59 in FIG. 4 and illustrated in detail in FIG. 5. As seen in FIG. 3, indicated by legend an arrow, amplifier 58 and system 59 are located externally of the reactor vessel. The accelerometer 54 has a resonant frequency around the frequency range of the whistle signals for maximum sensitivity and is able to sustain 400° F. temperature conditions. The impedance converter 56 converts the high output impedance of the accelerometer 54 to low impedance (of order of 100 ohms) so that the signals can be sent through the long line or wire 57 to the amplifier 58 located exterior of the reactor without appreciable attenuations. The amplifier 58 amplifies the signals to a proper magnitude for the signal interpretation system 59 to work on. The long lead wire or line 57 can be routed through the coil cord with other electrical lines to the outside of the reactor vessel.

The signal interpretation system 59 electronically determines the time interval between the initiation of a scram and the time the control rod hit the bottom of the reactor core. A very distinct characteristic of the whistle signal is that the whistle tone can stay at a certain level for a rather long deviation (about 0.1 sec), while all other impact signals decay much faster. The ciruit logic is designed to integrate the total acoustic energy of a certain frequency range above a certain level which can give a maximum signal to noise ratio and a minimum chance of misinterpretation of the signal.

As shown in FIG. 5, acoustic signals produced by whistle 11 received by accelerometer and impedance converter assembly 52 and passed through amplifier 58 are simultaneously directed into a reference bandpass filter 60 and into a high frequency bandpass filter 61. The output signal from filter 60 is directed through an RMS to DC converter 62 to a divider 63, while the output signal from filter 61 is directed through an RMS to DC converter 64 to divider 63, with the output from divider 63 being directed into a level detector 65. A scram signal 66 is directed into a level detector 67 with the output therefrom passing to a set terminal of a latch activator 68 which actuates drive mechanism 48 of FIG. 3, while the output from level detector 65 passes to a reset terminal of activator 68. The output signals from activator 68 is directed into an interval timer 69, such that the time from initiation of the scram signal to the bottoming of the control rod drop in the reactor core can be determined.

As pointed out, the above-described system is capable of determining the individual time intervals of each of the control rods utilized in a scram. This is accomplished by changing the length of the resonator cavity 30 of the FIG. 2 whistle in each control rod such that the frequency of the whistle tone is different for each control rod dropped into the reactor core.

Jet-edge whistles, made in accordance with the invention have been built and tested, with the following results:

(1) The acoustic power output obtained was about 50 milliwatts at frequency of 33 kHz.

(2) The highest operating frequency range obtained was 100-125 kHz with total acoustic power output of about 4.5 milliwatts.

(3) By changing the length of the resonator cavity, the frequency of the whistle tone was changed from 108 kHz to 121 kHz. It was found that there is almost a perfect linear relation between the cavity length and the frequency of the whistle tone.

(4) The whistle produced a distinctive signature which could be detected by an accelerometer located at least 13 feet away.

It has thus been shown that the present invention provides a real-time detection system for determining the timing of each control rod in a reactor during a scram operation. Thus, an important parameter in LMFBR, for example, safety is readily provided by the present invention; namely, accurately determining the time duration between the time a control rod is released and the time the rod actually reaches the down position in the reactor core.

While particular embodiments and parameters have been illustrated and/or described, modifications will become apparent to those skilled in the art, and it is intended to cover in the appended claims all such modifications as come within the spirit and scope of the invention.

What is claimed is:

1. A real-time-timing measurement system for determining the time duration for a reactor control rod from release to down position, comprising: means for producing an acoustic signal upon a control rod reaching its down position, means for receiving and amplifying the acoustic signal, and means for comparing a time of the acoustic signal with a time of release of the control rod, said acoustic signal producing means including a fluid activated jet-edge whistle having an adjustable resonator cavity which is activated by a fluid pressure pulse produced upon an associated control rod reaching down position.

2. The system defined in claim 1, wherein said receiving and amplifying means comprises an accelerometer for detecting the acoustic signal, an impedance converter for converting the signal from the accelerometer to a low impedance signal, and an amplifier for receiving and amplifying the signal from the impedance converter.

3. The system defined in claim 2, wherein said comparing means includes a pair of bandpass filters adapted to receive the amplified signal from said amplifier, one of said filters being a reference filter, a pair of RMS-to-DC converters each operatively connected to the output of one of said filters, a divider connected to receive an output from each of said converters and having an output operatively connected to a first level detector, a second level detector adapted to receive a control rod release signal, a latch activator adapted to receive signals from each of said level detectors and directing an output signal into an interval timer, whereby the signal for releasing a control rod is time compared to a signal generated by the control rod reaching its down position establishing the time duration from release to down position of a control rod.

4. The system defined in claim 2, wherein said accelerometer and said impedance converter are positioned within an associated reactor vessel, and wherein said amplifier means and said comparing means are positioned externally of an associated reactor vessel, said signal from said impedance converter to said amplifier passing through a line extending from within an associated reactor vessel to externally thereof without appreciable attenuations of the signal.

5. The system defined in claim 1, wherein said acoustic signal producing means is positioned within a vertically oriented upper portion of an associated control rod.

6. The system defined in claim 1, wherein said jet-edge whistle includes a bellows for producing a pressure pulse upon an associated control rod reaching a down position, a casing having apertures therein, a first member secured in said casing and having a central chamber extending therethrough and a plurality of radially extending configured openings providing fluid communication between said chamber and said apertures in said casing, a second member secured within said casing and having a stem section extending into said chamber, said second member having opening therein for fluid communication between said bellows and said chamber, said stem section having a reduced diameter end portion defining a half-wavelength central stem, and adjustable means extending into said central chamber and defining said adjustable resonator cavity between said adjustable means and said central stem.

7. The system defined in claim 6, wherein said central chamber includes a first section defining a flow convergent channel, and second section adjacent said first section defining a flow straightening section, said second section terminating adjacent said radially extending openings, said first and second sections of said central chamber together with said stem section of said second member defining a jet nozzle through which a fluid pressure pulse from said bellows is directed.

8. The system defined in claim 7, wherein said body member is also configured to define a sharp wedge shaped section adjoining said central chamber and said radially extending openings at a point opposite said radially extending openings from said flow straightening section of said chamber.

9. The system defined in claim 6, wherein said casing is located intermediate an upper end plate and a coupling head of an associated control rod, said bellow being positioned with an upper end portion of an associated control rod and operatively secured adjacent said second member of said jet-edge whistle.

* * * * *